US012727064B2

(12) United States Patent
Kito

(10) Patent No.: US 12,727,064 B2
(45) Date of Patent: Sep. 1, 2026

(54) LIGHTING DEVICE

(71) Applicant: Sharp Display Technology Corporation, Kameyama City (JP)

(72) Inventor: Hiroyuki Kito, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 60 days.

(21) Appl. No.: 18/915,545

(22) Filed: Oct. 15, 2024

(65) Prior Publication Data

US 2025/0168946 A1 May 22, 2025

(30) Foreign Application Priority Data

Nov. 16, 2023 (JP) ................................ 2023-194899

(51) Int. Cl.
*H05B 45/20* (2020.01)
*H05B 45/345* (2020.01)

(52) U.S. Cl.
CPC ........... *H05B 45/20* (2020.01); *H05B 45/345* (2020.01)

(58) Field of Classification Search
None
See application file for complete search history.

(56) References Cited

U.S. PATENT DOCUMENTS

| | | | | |
|---|---|---|---|---|
| 7,863,829 | B2 * | 1/2011 | Sayers .................. | G06Q 50/06 315/153 |
| 2010/0033109 | A1 | 2/2010 | Liu et al. | |
| 2011/0248648 | A1 | 10/2011 | Liu | |
| 2011/0316447 | A1 | 12/2011 | Liu | |
| 2012/0032613 | A1 | 2/2012 | Liu et al. | |

FOREIGN PATENT DOCUMENTS

JP 2010-040509 A 2/2010

* cited by examiner

*Primary Examiner* — Kenneth B Wells
(74) *Attorney, Agent, or Firm* — ScienBiziP, P.C.

(57) ABSTRACT

A lighting device includes a first light emitting element, a second light emitting element, and a driving circuit driving the first light emitting element and the second light emitting element. The driving circuit includes a current supply supplying currents to the first light emitting element and the second light emitting element, a first current controller controlling a magnitude of a first current supplied from the current supply to the first light emitting element, and a second current controller controlling a magnitude of a second current supplied from the current supply to the second light emitting element.

4 Claims, 5 Drawing Sheets

LIGHTING DEVICE

BACKGROUND

1. Field

The present disclosure relates to a lighting device.

2. Description of the Related Art

Japanese Unexamined Patent Application Publication No. 2010-040509 discloses a driving circuit that drives light-emitting diodes (LEDs) in a lighting device. The driving circuit may supply a light source with power that is high enough to cause the LEDs to output light of relatively fixed brightness.

LED chips, each chip having multiple light-emitting elements mounted thereon (also referred to as multi-LED chips), are disclosed. A display apparatus with such an LED chip employed in a lighting device may enlarge a display-able color gamut or increase an amount of emitted light per chip.

Each of the driving circuits of the related art outputs a current of one magnitude. Multiple driving circuits are to be mounted on a lighting device to supply currents of different magnitudes respectively to light-emitting elements included in the multi-LED chip. The use of multiple driving circuits in the lighting device leads to an increase in a mounting area, providing difficulty in designing a compact and thin lighting device.

It is desirable to provide a lighting device that supplies currents of different magnitudes to light emitting elements while controlling an increase in a mounting area of a driving circuit.

SUMMARY

According to an aspect of the disclosure, there is provided a lighting device including a first light emitting element, a second light emitting element, and a driving circuit driving the first light emitting element and the second light emitting element, wherein the driving circuit includes a current supply supplying currents to the first light emitting element and the second light emitting element, a first current controller controlling a magnitude of a first current supplied from the current supply to the first light emitting element, and a second current controller controlling a magnitude of a second current supplied from the current supply to the second light emitting element.

DESCRIPTION OF THE EMBODIMENTS

First Embodiment

Figure 1:
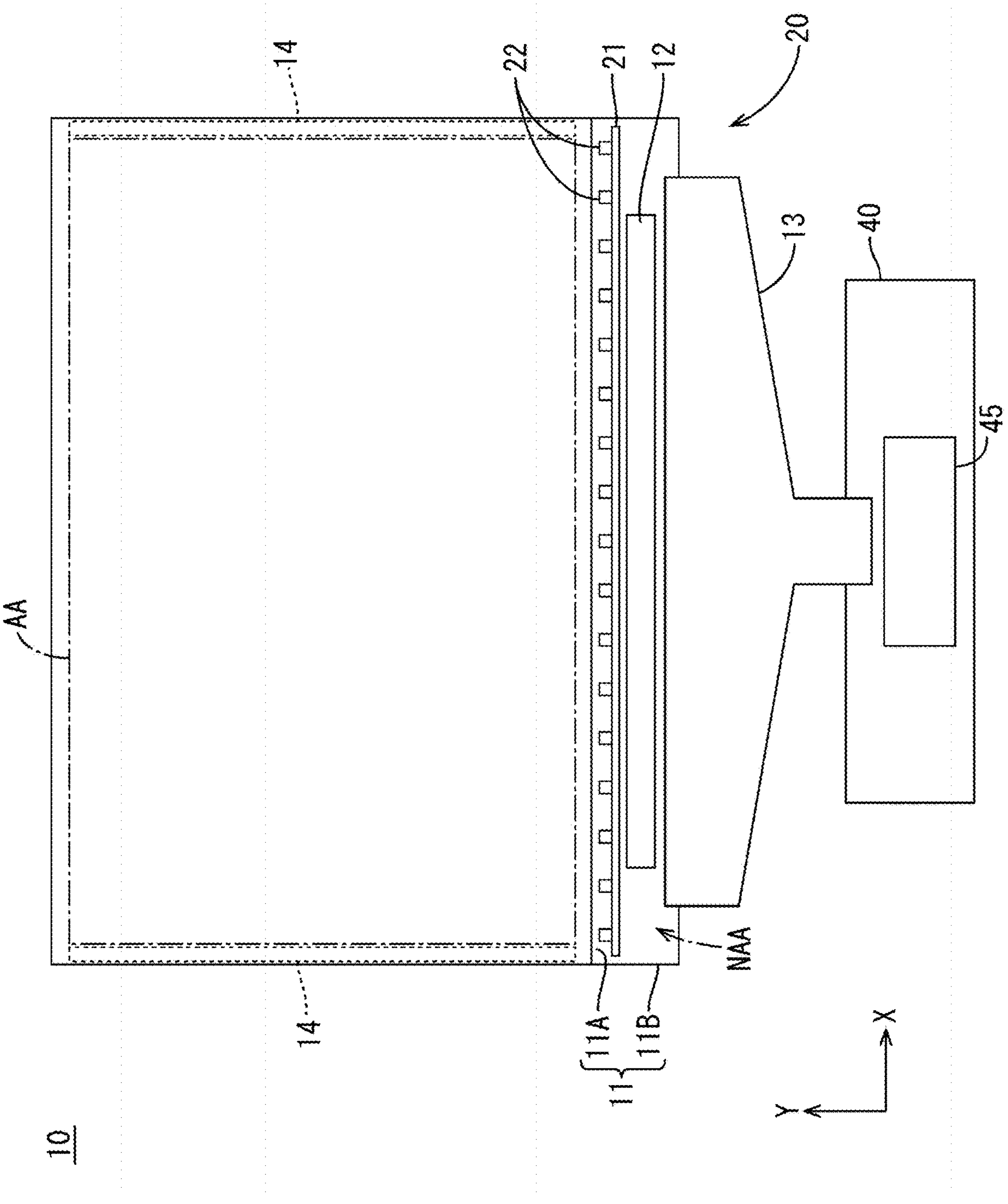
FIG. 1 is a plan view schematically illustrating a liquid-crystal display device.
Figure 2:
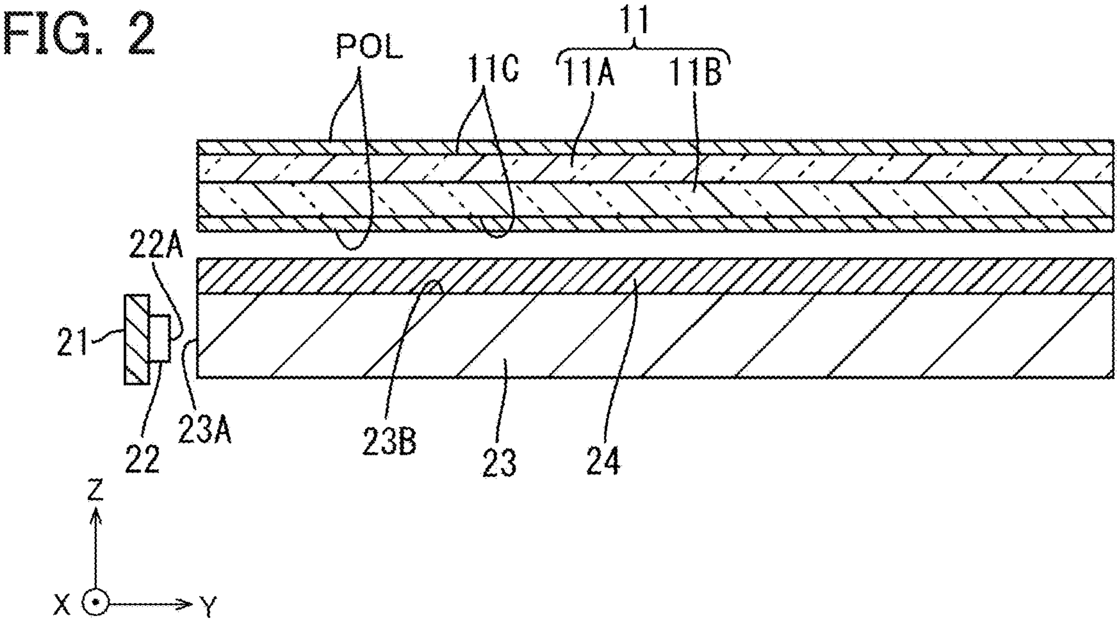
FIG. 2 is a cross-sectional view illustrating the liquid-crystal display device.

A lighting device 20 of an embodiment of the disclosure is described with reference to FIGS. 1 through 6. Referring to FIGS. 1 and 2, X, Y and Z lines are drawn to represent respective directions of X, Y and Z axes.

Whole Configuration

FIG. 1 is a plan view schematically illustrating a liquid-crystal display device 10 including the lighting device 20 of the embodiment. As illustrated in FIG. 1, the liquid-crystal display device 10 is rectangular and includes a liquid-crystal panel 11 displaying an image, a control board 40, a flexible board 13 that connects the liquid-crystal panel 11 to the control board 40, and other elements.

The central portion of the display of the liquid-crystal panel 11 is a display region AA (region enclosed by a dash-dot line in FIG. 1) displaying an image. An external region along the frame of the display of the liquid-crystal panel 11 surrounding the display region AA is a non-display region NAA that does not display any image.

The liquid-crystal panel 11 includes a pair of substrates 11A and 11B that are glued together. The substrate 11A is a front-side substrate and the substrate 11B is a rear-side array substrate (active-matrix substrate or element substrate). Each of the substrates 11A and 11B includes a variety of film layers laminated inside a glass plate. A polarizer POL is glued to the external surface of each of the substrates 11A and 11B (see FIG. 2).

Referring to FIG. 1, each of the short sides of the substrate 11A is shorter than each of the short sides of the substrate 11B. One long side end portion of the substrate 11B does not overlap the substrate 11A. A driver 12 and the flexible board 13 are mounted on the non-overlap portion of the substrate 11B.

The driver 12 includes a large-scale integrated (LSI) chip having a circuit driving the liquid-crystal panel 11. The driver 12 is chip-on-glass (COG) mounted on the substrate 11B and processes a variety of signals transmitted via the flexible board 13.

The flexible board 13 is a wiring board having a large number of wiring line patterns on a base plate formed of a synthetic resin material (such as polyimide resin) having insulation and flexibility. One end of the flexible board 13 is connected to the non-display region NAA of the liquid-crystal panel 11 and the other end of the flexible board 13 is connected to the control board 40. As described below, the control board 40 is a rigid board having a driving circuit 41 and the like mounted thereon.

A variety of signals supplied from the control board 40 are transferred to the liquid-crystal panel 11 via the flexible board 13, processed by the driver 12 mounted on the non-display region NAA and then output to the display region AA. The non-display region NAA of the substrate 11B includes a pair of gate circuits 14 between which the display region AA is arranged in the direction of the X axis. The gate circuit 14 supplies scanning signals to gate lines.

As illustrated in FIGS. 1 and 2, the lighting device 20 includes an LED substrate 21 having the multi-LED chips 22 mounted thereon, a light guide plate 23 that guides output light from the multi-LED chips 22, an optical sheet 24 having an optical effect on the output light from the light guide plate 23, the driving circuit 41 and the like.

The LED substrate 21 has a plate-like shape and extends in the long side direction of the liquid-crystal panel 11 (the X axis direction). The multi-LED chips 22 are arranged with space therebetween in the X axis direction on one surface of the LED substrate 21. The LED substrate 21 includes wirings and terminals used to power each multi-LED chip 22.

The light guide plate 23 is manufactured of a synthetic region material (such as acrylic resin, for example, polymethyl methacrylate (PMMA)) that is transparent and has a refractive index sufficiently higher than that of air. The light guide plate 23 has a plate-like shape and is arranged on the rear side of the liquid-crystal panel 11.

Referring to FIG. 2, light emitted from the multi-LED chips 22 is incident on an end face 23A of the outer peripheral end faces of the long sides of the light guide plate 23. The incident light travels within the light guide plate 23 and exits toward the liquid-crystal panel 11 from a plate surface 23B of the pair of plate surfaces of the light guide plate 23. The place surface 23B is on the front side and faces the plate surface 11C of the liquid-crystal panel 11.

The optical sheet 24 is arranged between the liquid-crystal panel 11 and the light guide plate 23 and allows the output light from the light guide plate 23 to transmit therethrough while giving a predetermined optical effect on the output light.

Multi-LED Chip

Figure 3:
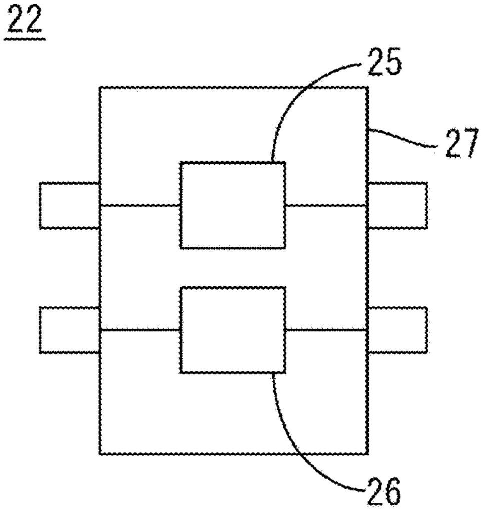
FIG. 3 is a plan view of a multi-LED chip.

The multi-LED chip 22 is described with reference to FIGS. 3 and 4. The multi-LED chip 22 includes a first LED element 25 (an example of a first light emitting element), a second LED element 26 (an example of a second light emitting element), a container 27 that contains the two LED elements 25 and 26, a sealing part 28 that fills the container 27 to seal the two LED elements 25 and 26. The container 27 has on the external surface thereof multiple terminals that are respectively electrically connected to the two LED elements 25 and 26.

The first LED element 25 and the second LED element 26 are blue-light LED elements, and when supplied with predetermined currents, emit monochromatically blue light within a wavelength range of blue light (about 400 nm to about 500 nm). In the following discussion, however, light emission wavelengths of the LED elements are not the same within the wavelength range of blue light.

Figure 4:
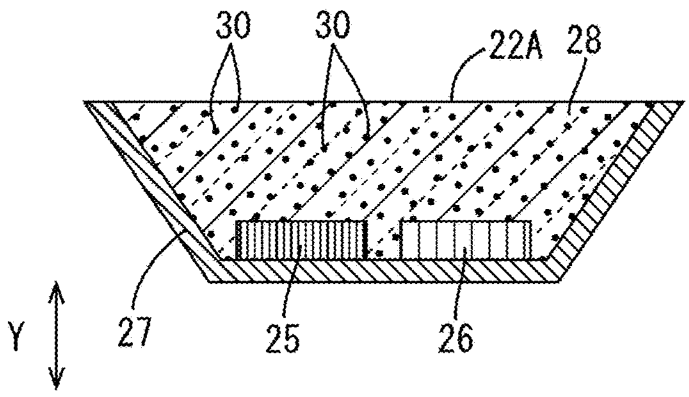
FIG. 4 is a cross-sectional view of the multi-LED chip.

Referring to FIG. 4, the container 27 has an almost cylindrical shape with bottom open toward the end face 23A of the light guide plate 23. The sealing part 28 is manufactured of a resin material that has excellent light transmission. The sealing part 28 filling the container 27 closes the opening of the container 27 and forms a light emitting surface 22A.

The multi-LED chip 22 includes a fluorescent substance 30 that wavelength-converts part of the blue light emitted from the LED elements 25 and 26. The fluorescent substance 30 is mixed with the sealing part 28 at a predetermined concentration. The fluorescent substance 30 includes green-light phosphors that wavelength-convert blue light into green light within a wavelength region of green light (about 500 nm to about 570 nm) and red-phosphors that wavelength-convert blue light into red light within a wavelength region of red light (about 600 nm to about 780 nm).

As described above, the first LED element 25 and the second LED element 26 are not the same in terms of the light emission wavelength. The color gamut of the output light wavelength-converted by the fluorescent substance 30 is different from when only the first LED element 25 is caused to emit light to when only the second LED element 26 is caused to emit light.

Figure 5:
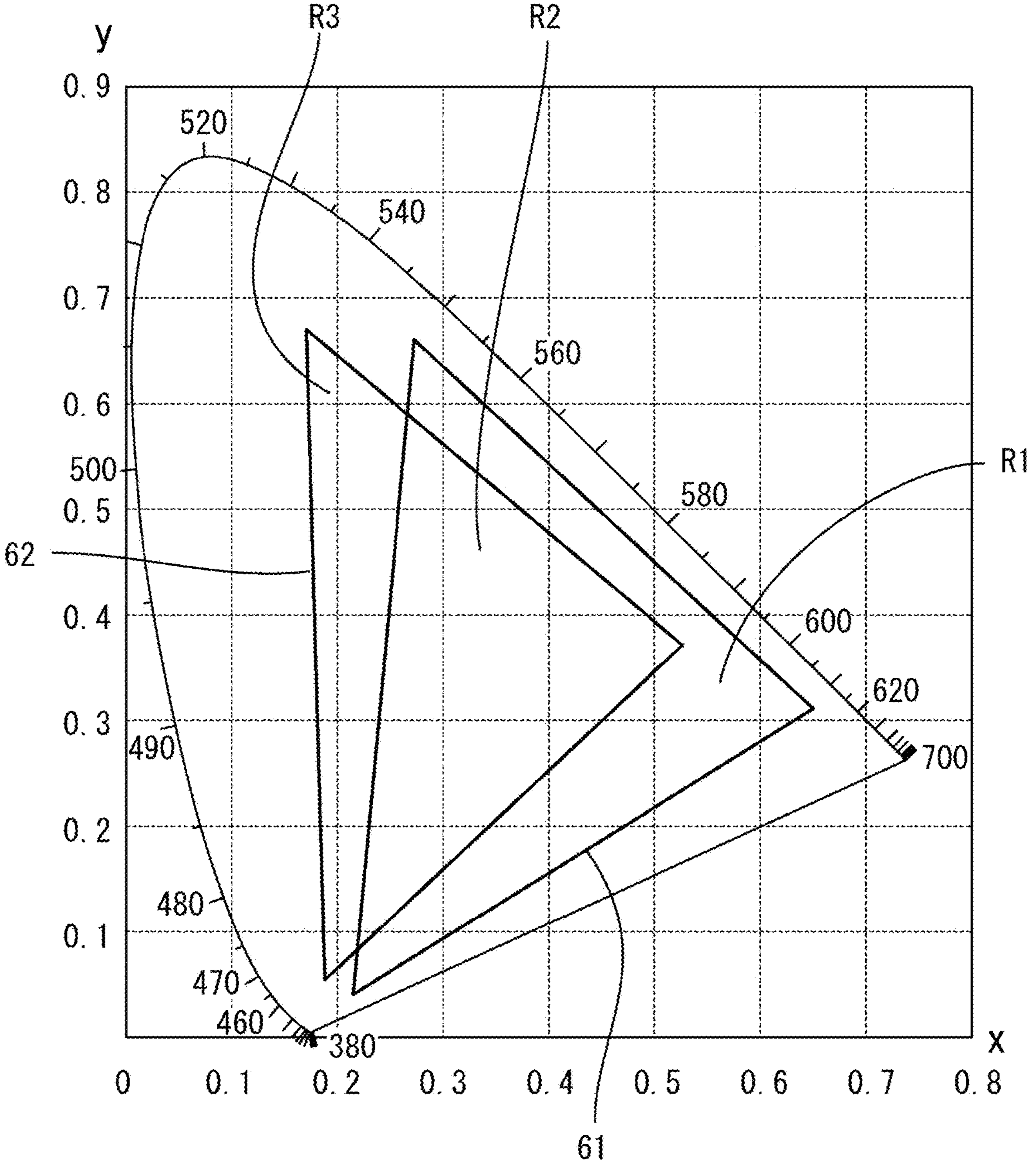
FIG. 5 is a graph illustrating color gamut of the multi-LED chip.

FIG. 5 illustrates a CIE (Commission Internationale de l'Eclairage) 1931 chromaticity diagram. In the chromaticity diagram, a color gamut of the output light with only the first LED element 25 emitting light is a first color gamut 61 having a triangular shape and a color gamut of the output light with only the second LED element 26 emitting light is a second color gamut 62 having a triangular shape.

The first color gamut 61 includes a region R1 not overlapping the second color gamut 62 and a region R2 overlapping the second color gamut 62. The second color gamut 62 includes a region R3 not overlapping the first color gamut 61 and the region R2 overlapping the first color gamut 61. The second color gamut 62 has at least a portion thereof (the region R3) not overlapping the first color gamut 61.

By lighting one of the LED elements 25 and 26, any color gamut to be displayed may be selected from the first color gamut 61 (the region R1+the region R2) and the second color gamut 62 (the region R2+the region R3). Since an optimum color gamut may be selected in response to an image to be displayed, display quality of image may be improved.

Both the first LED element 25 and the second LED element 26 may be lit at the same time. In such a case, the color gamut displayable is the sum of the first color gamut 61 and the second color gamut 62 (the region R1+the region R2+the region R3) and is thus wider than when one of the LED elements 25 and 26 is lit. The color gamut displayable on the liquid-crystal panel 11 is thus widened and the display quality of image may be improved.

Driving Circuit of Lighting Device

Figure 6:
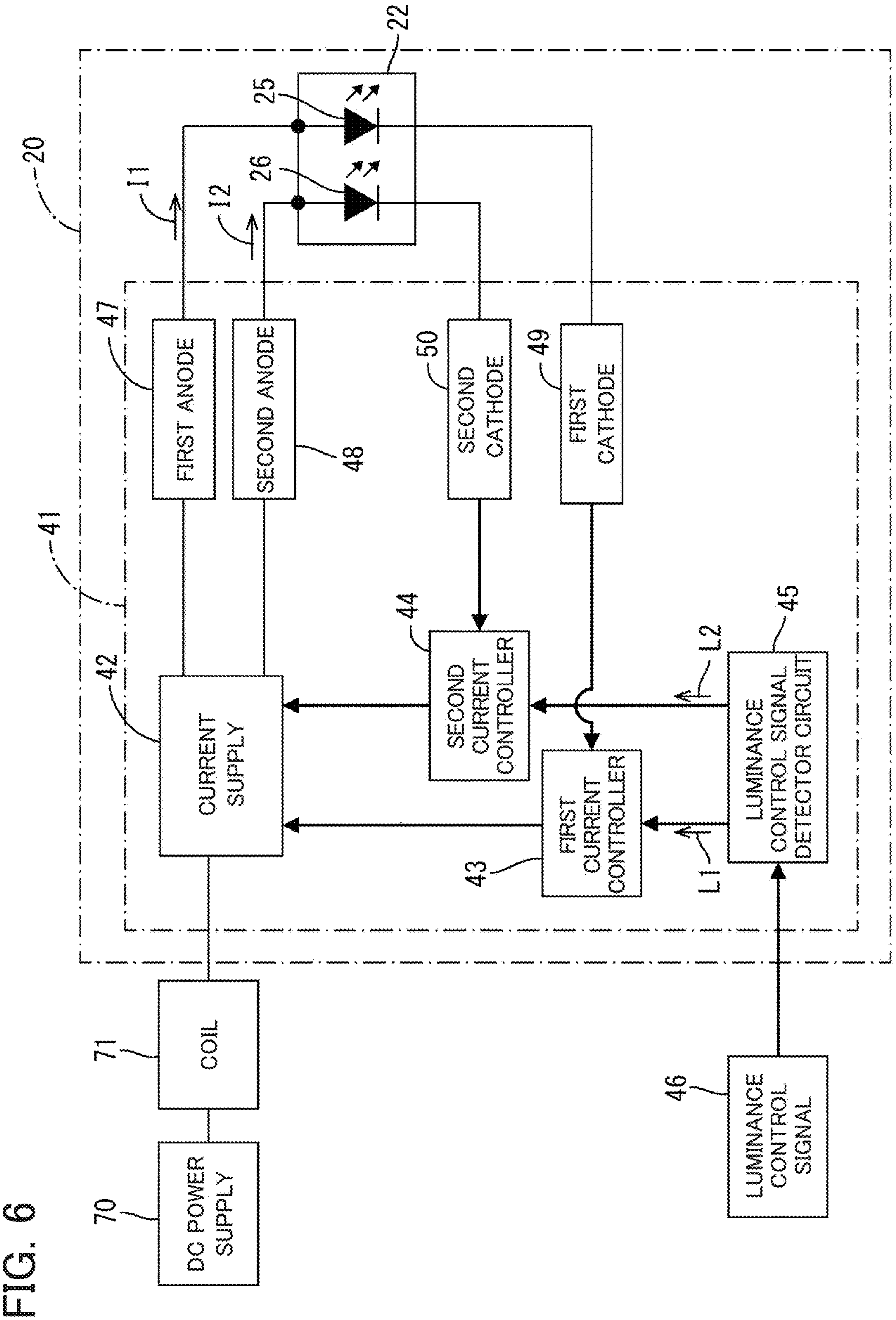
FIG. 6 is a block diagram illustrating an electrical configuration of a lighting device.

The driving circuit 41 of the lighting device 20 is described below. FIG. 6 is a block diagram illustrating an electrical configuration of the lighting device 20. The lighting device 20 includes the first LED element 25, the second LED element 26 and the driving circuit 41. A direct-current (DC) current is output from the DC power supply 70, an alternating-current (AC) component is removed from the DC current by the coil 71, and then the DC current free from the AC component is input to the driving circuit 41.

The driving circuit 41 powers and thus controls the LED elements 25 and 26. The driving circuit 41 includes a current supply 42, a first current controller 43, a second current controller 44, a luminance control signal detector circuit 45 and the like.

The current supply 42, the two current controllers 43 and 44 and the luminance control signal detector circuit 45, forming the driving circuit 41, may be mounted as individual chips on the control board 40 or may be integrated into one or more chips and then mounted on the control board 40.

A first anode 47 and a second anode 48 serve as terminals to which a current driving the multi-LED chip 22 is output. The first anode 47 is electrically connected to an anode terminal of the first LED element 25 and the second anode 48 is electrically connected to an anode terminal of the second LED element 26. A first cathode 49 and a second cathode 50 are respectively electrically connected to cathode terminals of the first LED element 25 and the second LED element 26.

The current having flown through the first LED element 25 is fed back via the first cathode 49 to the first current controller 43. The current having flown through the second LED element 26 is fed back via the second cathode 50 to the second current controller 44. The first current controller 43 and the second current controller 44 detect the magnitudes of the currents having flown actually through the LED elements 25 and 26 and then perform correction in response to the detected values.

The luminance control signal detector circuit 45 detects a luminance control signal 46 input from the outside and outputs luminance information (first luminance information L1 and second luminance information L2) of the LED elements 25 and 26. The luminance control signal 46 includes the luminance information on each of the LED elements 25 and 26. The luminance control signal detector circuit 45, when detecting the luminance control signal 46, outputs the first luminance information L1 to the first current controller 43 and the second luminance information L2 to the second current controller 44. When luminance is adjusted in accordance with pulse width modulation (PWM), the luminance information L1 and L2 on the LED elements 25 and 26 may be represented by a time rate (duty factor) of a lighting period to a non-lighting period.

The first current controller 43 sets a first current I1 to be a current that causes the first LED element 25 to light at luminance responsive to the first luminance information L1. The first current controller 43 instructs the current supply 42 to supply the first LED element 25 with the set first current I1. The first LED element 25 supplied with the first current I1 lights at predetermined luminance specified by the first luminance information L1.

Similarly, the second current controller 44 sets a second current I2 to be a current that causes the second LED element 26 to light at luminance responsive to the second luminance information L2. The second current controller 44 instructs the current supply 42 to supply the second LED element 26 with the second current I2. The second LED element 26 supplied with the second current I2 lights at predetermined luminance specified by the second luminance information L2.

Effects

The driving circuit 41 may output two kinds of currents (the first current I1 and the second current I2). The first current I1 is supplied to the first LED element 25 while the second current I2 is supplied to the second LED element 26. The single driving circuit 41 in the lighting device 20 of the embodiment may cause the two LED elements 25 and 26 to light with two different currents.

The lighting device 20 of the embodiment is not involved in the configuration that different driving circuits are respectively arranged for the different types of currents to be supplied. In other words, a single driving circuit 41 may cause multiple LED elements to light. In the lighting device 20 including multiple types of LED elements, such as the multi-LED chip 22, an increase in the mounting area of the driving circuit 41 on the control board 40 may be controlled.

At least a portion of the region R1 of the first color gamut 61 as the color gamut of the first LED element 25 (the region R1+the region R2) does not overlap the second color gamut 62 of the second LED element 26 (the region R2+the region R3).

When only the first LED element 25 is lit, the color gamut displayable on the liquid-crystal panel 11 is only the first color gamut 61 (the region R1+the region R2). In the configuration of the embodiment, lighting of both the first LED element 25 and the second LED element 26 causes to be displayable not only the first color gamut 61 but also a region of the second color gamut 62 (namely the region R3) not overlapping the first color gamut 61. The color gamut may thus be widened and the display quality may be improved more than when only the first LED element 25 is lit.

The technique disclosed herein is not limited to the embodiment described with reference to the drawings and may cover the scope of techniques disclosed in the following embodiments.

Figure 7:
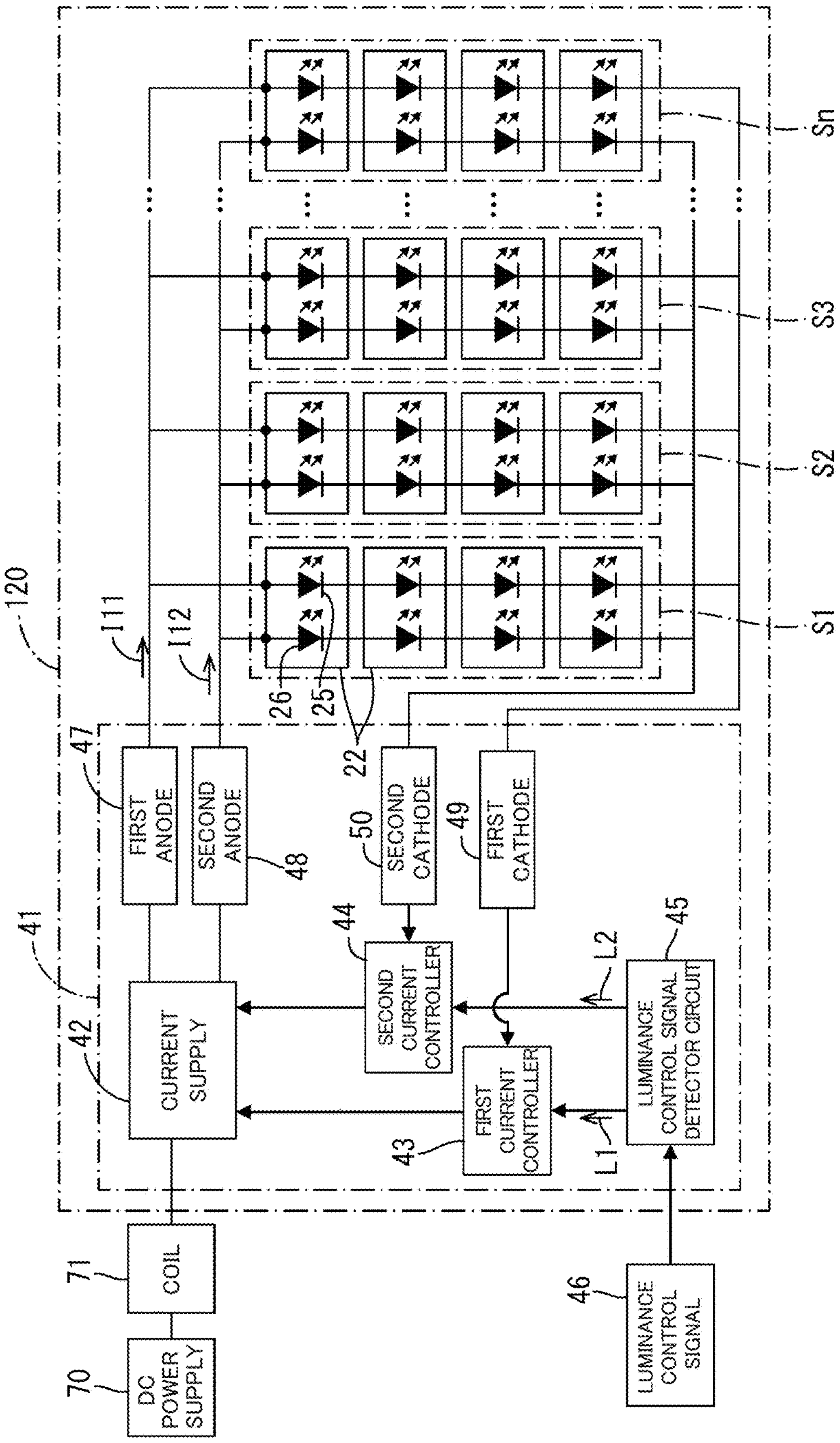
FIG. 7 is a block diagram illustrating an electrical configuration of a lighting device including multiple multi-LED chips.

(1) In the embodiment described above, the lighting device 20 includes the single multi-LED chip 22 as illustrated in FIG. 6. Alternatively, the lighting device 20 may include multiple multi-LED chips 22 as illustrated in FIG. 7. Elements having the same operation and effect as described in the embodiment are designated with the same reference numerals and the discussion thereof is not repeated.

FIG. 7 is a block diagram illustrating an electrical configuration of a lighting device 120 having multiple multi-LED chips 22. The lighting device 120 includes n LED strings S1 through Sn, each string including serially connected multiple multi-LED chips 22 (for example, four multi-LED chips 22). In each of the LED strings S1 through Sn, four first LED elements 25 are serially connected and four second LED elements 26 are serially connected.

The serial connection of the four first LED elements 25 has an anode terminal connected to the first anode 47 and a cathode terminal connected to the first cathode 49. The serial connection of the four second LED elements 26 has an anode terminal connected to the second anode 48 and a cathode terminal connected to the second cathode 50.

In this configuration, the current supply 42 may supply a first current I11 to the multiple first LED elements 25 via the first anode 47. Similarly, the current supply 42 may supply a second current I12 to multiple second LED elements 26 via the second anode 48. In this way, the first LED elements 25 and the second LED elements 26 forming the strings S1 through Sn may be caused to emit light at different currents (the first current I11 and the second current I12).

(2) In the embodiment described above, the lighting device 20 uses an edge lighting method and thus includes light emitting elements aligned along the edge of the liquid-crystal panel 11. The lighting device may use a direct lighting method and thus includes multiple light emitting elements arranged directly below the rear surface of the liquid-crystal panel 11.

(3) In the embodiment described above, the lighting device 20 serves as back lighting of the liquid-crystal display device 10. The application of the lighting device 20 is not limited to back lighting. The lighting device 20 of the disclosure may be applied as pixels of lighting equipment or large-screen display.

(4) In the embodiment described above, at least a portion (the region R3) of the second color gamut 62 (the region R2+the region R3) of the second LED element 26 does not overlap the first color gamut 61 of the first LED element 25 (the region R1+the region R2). In this example, the first color gamut 61 and the second color gamut 62 overlap each other in the region R2.

It is acceptable that the second color gamut 62 does not overlap the first color gamut 61 at all. In such a case, lighting both the first LED element 25 and the second LED element 26 may be widened more than when only the first LED element 25 is lit.

(5) A non-overlapping portion may not be present between the second color gamut 62 and the first color gamut 61. For example, this is the case in which the first color gamut 61 matches the second color gamut 62 or the first color gamut 61 includes the entire second color gamut 62. Lighting of both the first LED element 25 and the second LED element 26 may increase an amount of emitted light in the overlapping area.

The present disclosure contains subject matter related to that disclosed in Japanese Priority Patent Application JP 2023-194899 filed in the Japan Patent Office on Nov. 16, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lighting device comprising:

a first light emitting element;

a second light emitting element; and a driving circuit that drives the first light emitting element and the second light emitting element, wherein the driving circuit includes:

a current supply that supplies currents to the first light emitting element and the second light emitting element, a first current controller that controls a magnitude of a first current supplied from the current supply to the first light emitting element, a second current controller that controls a magnitude of a second current supplied from the current supply to the second light emitting element, and a luminance control signal detector circuit that:

detects a luminance control signal input from outside, the luminance control signal including first luminance information of the first light emitting element and second luminance information of the second light emitting element, outputs the first luminance information to the first current controller, and outputs the second luminance information to the second current controller.

2. The lighting device according to claim 1, wherein a color gamut of light emitted from the second light emitting element overlaps at least part of a color gamut of light emitted from the first light emitting element.

3. The lighting device according to claim 1, wherein a light emission wavelength of first light emitted from the first light emitting element is different from a light emission wavelength of second light emitted from the second light emitting element, and the lighting device further comprises a chip containing the first light emitting element and the second light emitting element.

4. The lighting device according to claim 3, wherein the chip includes a fluorescent substance that converts the light emission wavelength of the first light and the light emission wavelength of the second light.

* * * * *